United States Patent
Yamakawa et al.

(10) Patent No.: US 10,927,438 B2
(45) Date of Patent: *Feb. 23, 2021

(54) FE-NI-CR ALLOY, FE-NI-CR ALLOY STRIP, SHEATH HEATER, METHOD OF MANUFACTURING FE-NI-CR ALLOY, AND METHOD OF MANUFACTURING SHEATH HEATER

(71) Applicant: Nippon Yakin Kogyo Co., Ltd., Tokyo (JP)

(72) Inventors: Kazuhiro Yamakawa, Tokyo (JP); Shigeru Hirata, Tokyo (JP); Kun Wang, Tokyo (JP); Hidekazu Todoroki, Tokyo (JP)

(73) Assignee: Nippon Yakin Kogyo Co., Ltd., Tokyo (JP)

( * ) Notice: Subject to any disclaimer, the term of this patent is extended or adjusted under 35 U.S.C. 154(b) by 185 days.

This patent is subject to a terminal disclaimer.

(21) Appl. No.: 16/304,781

(22) PCT Filed: Mar. 14, 2017

(86) PCT No.: PCT/JP2017/010205
§ 371 (c)(1),
(2) Date: Nov. 27, 2018

(87) PCT Pub. No.: WO2017/208563
PCT Pub. Date: Dec. 7, 2017

(65) Prior Publication Data
US 2019/0360079 A1    Nov. 28, 2019

(30) Foreign Application Priority Data
May 31, 2016   (JP) .............. JP2016-109325

(51) Int. Cl.
*C22C 30/02* (2006.01)
*B32B 15/01* (2006.01)
*C22C 1/02* (2006.01)
*C22F 1/16* (2006.01)
*C23C 30/00* (2006.01)
*H05B 3/48* (2006.01)

(52) U.S. Cl.
CPC .......... *C22C 30/02* (2013.01); *B32B 15/011* (2013.01); *C22C 1/02* (2013.01); *C22F 1/16* (2013.01); *C23C 30/005* (2013.01); *H05B 3/48* (2013.01); *H05B 2203/017* (2013.01)

(58) Field of Classification Search
CPC ......... B32B 15/011; C21C 7/04; C21C 7/064; C21C 7/072; C21D 1/76; C21D 9/46; C22C 1/02; C22C 30/02; C22C 38/004; C22C 38/02; C22C 38/04; C22C 38/42; C22C 38/44; C22C 38/50; C22C 38/52; C22C 38/58; C22F 1/16; C23C 30/005; H05B 2203/017; H05B 3/12; H05B 3/48; Y02P 10/242

See application file for complete search history.

(56) References Cited

U.S. PATENT DOCUMENTS

| 3,729,308 A | 4/1973 | Eiselstein et al. |
| 5,160,382 A | 11/1992 | Smith et al. |
| 2013/0200068 A1 | 8/2013 | Hattendorf et al. |
| 2013/0309124 A1* | 11/2013 | Yamakawa ............. C22C 38/58 420/38 |
| 2015/0376752 A1 | 12/2015 | Yamakawa et al. |

FOREIGN PATENT DOCUMENTS

| CN | 103422028 A | 12/2013 |
| JP | S5825746 B2 | 5/1983 |
| JP | S6160868 A | 3/1986 |
| JP | S648695 B2 | 2/1989 |
| JP | S6411106 B2 | 2/1989 |
| JP | H0246663 B2 | 10/1990 |
| JP | H05247598 A | 9/1993 |
| JP | 2003147492 A | 5/2003 |
| JP | 2013241650 A | 12/2013 |

OTHER PUBLICATIONS

Oct. 23, 2019, the Extended European Search Report issued by the European Patent Office in the corresponding European Patent Application No. 17806125.5.
Jun. 20, 2017, International Search Report issued in the International Patent Application No. PCT/JP2017/010205.
Dec. 4, 2018, International Preliminary Report on Patentability issued in the International Patent Application No. PCT/JP2017/010205.
Mar. 30, 2020, Office Action issued by the China National Intellectual Property Administration in the corresponding Chinese Patent Application No. 201780031799.2.
Oct. 28, 2020, Office Action issued by the China National Intellectual Property Administration in the corresponding Chinese Patent Application No. 201780031799.2.

* cited by examiner

*Primary Examiner* — Jenny R Wu
(74) *Attorney, Agent, or Firm* — Kenja IP Law PC

(57) ABSTRACT

Provided is an Fe—Ni—Cr alloy that has excellent surface characteristics and enables formation of a blackened coating having excellent blackening characteristics and peeling resistance. The Fe—Ni—Cr alloy has a chemical composition containing, by mass %, C, Si, Mn, P, S, Cr, Ni, Mo, Co, Cu, N, Ti, Al, O, and H, the balance being Fe and inevitable impurities, and satisfying formulae (1) to (4): (1) $T1=11\times[\% N]+0.1$; (2) $T2=-39\times[\% N]-1.0$; (3) $A1=7.5\times[\% N]+0.1$; (4) $A2=-42.5\times[\% N]+1.0$, where [% M] represents content (mass %) of element M in the alloy, and T1, T2, A1, and A2 satisfy relationships $T1<[\% Ti]<T2$ and $A1<[\% Al]<A2$.

17 Claims, No Drawings

FE-NI-CR ALLOY, FE-NI-CR ALLOY STRIP, SHEATH HEATER, METHOD OF MANUFACTURING FE-NI-CR ALLOY, AND METHOD OF MANUFACTURING SHEATH HEATER

TECHNICAL FIELD

The present disclosure relates to an Fe—Ni—Cr alloy and, in particular, relates to an Fe—Ni—Cr alloy, an Fe—Ni—Cr alloy strip, and a method of manufacturing an Fe—Ni—Cr alloy that have excellent surface characteristics and enable formation of a blackened coating having excellent blackening characteristics and peeling resistance, and to a sheath heater including a sheath having high emissivity and excellent thermal efficiency and a method of manufacturing this sheath heater.

BACKGROUND

Sheath heaters in which nichrome wire is used are widely used as heat sources in electric cooking appliances and the like. In a sheath heater, nichrome wire is inserted into a sheath made of metal, space inside the sheath is filled with magnesia powder or the like, the sheath is completely sealed, and then electricity is passed along the nichrome wire to generate heat and thereby perform heating. This heating method has a high level of safety because it does not use fire. Consequently, sheath heaters are widely used in electric cooking appliances such as fish grills as essential items in all-electric housing, and demand for sheath heaters has been increasing rapidly in recent years.

Particularly in the case of a sheath heater used in a high-temperature air environment, the surface of a sheath that is produced from a material containing specific amounts of Al and Ti is typically subjected to heat treatment referred to as blackening treatment in order to enable efficient heating of a heating target. This blackening treatment is performed with the aim of forming a compact black coating (hereinafter, referred to as a "blackened coating") having high emissivity at the surface of the sheath. Moreover, the blackening treatment differs from intermediate heat treatment performed part way through the manufacturing process, and is performed under conditions in which the dew point and components of an atmosphere gas are strictly controlled.

In addition, the sheath of a sheath heater is subjected to repeated heating and cooling during use and is, therefore, required to have characteristics such as excellent high-temperature strength, excellent thermal shock resistance, excellent resistance to repeated oxidation, and so forth.

Examples of materials used for sheaths of sheath heaters include Fe—Ni—Cr alloys such as Alloy 800 and Alloy 840. However, these Fe—Ni—Cr alloys suffer from problems such as surface defect formation during manufacturing and coating peeling after blackening treatment, and thus further enhancement thereof would be beneficial.

Therefore, techniques relating to adjustment of the chemical composition of Fe—Ni—Cr alloys have been disclosed with the aim of improving surface characteristics of Fe—Ni—Cr alloys. In one example, PTL 1 discloses a technique for inhibiting the production of TiN, which becomes a cause of surface defects, by controlling Ti content, N content, and Si content to within specific ranges.

However, the technique in PTL 1 is not appropriate for the material of a sheath heater because Mo, which has an effect of improving corrosion resistance, and Co, which contributes to austenite phase stabilization, are not included, and thus adequate corrosion resistance cannot be achieved with this technique. Moreover, the technique in PTL 1 does not consider favorable control of blackening characteristics or inhibition of blackened coating peeling.

In another example, PTL 2 discloses a technique for enhancing corrosion resistance in high-temperature dry corrosion environments by adjusting the contents of C, Mo, W, V, and so forth.

However, the technique in PTL 2 does not consider corrosion resistance specifically in wet environments and also requires further improvement in terms of inhibition of blackened coating peeling.

Moreover, PTL 3 discloses a technique for enhancing resistance to repeated oxidation by increasing the Mo content in an alloy.

However, the technique in PTL 3 does not consider corrosion resistance, and particularly corrosion resistance in high-temperature air environments and wet environments in a state in which the surface of the alloy is in a pure state without an oxide coating or in a state in which an oxide coating formed in intermediate heat treatment is present. The technique in PTL 3 also requires further improvement in terms of inhibition of blackened coating peeling.

In yet another example, PTL 4 discloses a technique for enhancing oxidation resistance by increasing the Cr content in an alloy and by also performing combined addition of Al and rare earth metal (REM) elements.

However, in the case of an alloy strip containing Al, Ti, and REM according to the technique in PTL 4, surface defects may form if the Cr content exceeds 25%, and there is also the possibility of deterioration of manufacturability and weldability. Moreover, the technique in PTL 4 does not sufficiently consider peeling resistance of a post-blackening treatment coating.

PTL 5 aims to enhance surface characteristics and enhance corrosion resistance in high-temperature and wet environments by, in addition to a parameter PRE that has conventionally been used to evaluate corrosion resistance, further introducing a parameter PREH that expresses the difference in pitting corrosion potential measured before and after heat treatment, and discloses an Fe—Ni—Cr alloy for which the parameter PREH is controlled to within an appropriate range.

Good surface characteristics and peeling resistance of a blackened coating can be achieved through the technique in PTL 5. However, it is difficult to control the N content in the alloy to a low level, and further improvement is desirable from a viewpoint of actual manufacturability of the Fe—Ni—Cr alloy. Furthermore, it would be beneficial to develop a technique that can more reliably enhance surface characteristics while also enabling formation of a blackened coating having enhanced blackening characteristics and peeling resistance.

CITATION LIST

Patent Literature

PTL 1: JP 2003-147492 A
PTL 2: JP S64-008695 B
PTL 3: JP S64-011106 B
PTL 4: JP H02-46663 B
PTL 5: JP 2013-241650 A

SUMMARY

Technical Problem

The present disclosure was completed in view of the circumstances described above and an objective thereof is to provide an Fe—Ni—Cr alloy, an Fe—Ni—Cr alloy strip, and a method of manufacturing an Fe—Ni—Cr alloy that have excellent surface characteristics and enable formation of a blackened coating having excellent blackening characteristics and peeling resistance. Another objective of the present disclosure is to provide a sheath heater including a sheath having high emissivity and excellent thermal efficiency, and a method of manufacturing this sheath heater.

Solution to Problem

As a result of research and examination conducted with the aim of solving the problems set forth above, the inventors focused on findings that surface characteristics of an alloy prior to blackening treatment, and blackening characteristics and peeling resistance of a blackened coating after blackening treatment are each influenced by N content in the alloy relative to Ti and Al contents in the alloy, and that surface characteristics and post-blackening treatment peeling resistance deteriorate if the N content relative to the Ti and Al contents increases to a level exceeding a specific range.

Through further diligent research, the inventors discovered that by including Ti, Al, and N in amounts satisfying specific relationships while also optimizing the alloy chemical composition to enable formation of a blackened coating having excellent blackening characteristics, it is possible to improve surface characteristics and significantly improve peeling resistance of the blackened coating compared to conventional Fe—Ni—Cr alloys while also maintaining high post-blackening treatment blackening characteristics. Moreover, the inventors discovered that by using this Fe—Ni—Cr alloy in a sheath of a sheath heater, it is possible to achieve higher emissivity and significantly improve thermal efficiency compared to conventional sheath heaters.

The present disclosure was completed based on these findings and has the following primary features.

[1] An Fe—Ni—Cr alloy comprising a chemical composition containing, by mass %, 0.005% to 0.03% of C, 0.17% to 1.0% of Si, 0.05% to 2.0% of Mn, 0.030% or less of P, 0.0002% to 0.0015% of S, 18% to 28% of Cr, 21.5% to 32% of Ni, 0.10% to 2.8% of Mo, 0.05% to 1.19% of Co, 0.01% to 0.25% of Cu, 0.003% to 0.018% of N, 0.10% to 1.0% of Ti, 0.10% to 1.0% of Al, 0.0002% to 0.007% of O, and 0.0010% or less of H, the balance being Fe and inevitable impurities, and satisfying formulae (1) to (4), shown below, $$T1=11\times[\% \text{ N}]+0.1 \tag{1}$$

$$T2=-39\times[\% \text{ N}]+1.0 \tag{2}$$

$$A1=7.5\times[\% \text{ N}]+0.1 \tag{3}$$

$$A2=-42.5\times[\% \text{ N}]+1.0 \tag{4}$$

where [% M] represents content, by mass %, of element M in the alloy, and T1, T2, A1, and A2 satisfy relationships T1<[% Ti]<T2 and A1<[% Al]<A2.

[2] The Fe—Ni—Cr alloy according to the foregoing [1], wherein
the Fe—Ni—Cr alloy has a blackened coating at a surface thereof,
the blackened coating contains Fe, Cr, Ni, Si, Mn, Al, Ti, and O, and, by mass %, has a Ti content of 1.9% to 4.5% and an Al content of 0.3% to 3.8%, and
the blackened coating has a thickness of 0.5 μm to 10 μm.

[3] The Fe—Ni—Cr alloy according to the foregoing [1] or [2], wherein
the blackened coating has an emissivity of 0.3 or more.

[4] An Fe—Ni—Cr alloy strip comprising the Fe—Ni—Cr alloy according to any one of the foregoing [1] to [3].

[5] A sheath heater comprising the Fe—Ni—Cr alloy according to any one of the foregoing [1] to [3] as a sheath.

[6] A method of manufacturing an Fe—Ni—Cr alloy comprising performing blackening treatment under a set of conditions including a treatment temperature of 900° C. to 1100° C., a dew point of −35° C. to 10° C., and a treatment time of 1 minute to 30 minutes with respect to an Fe—Ni—Cr alloy comprising a chemical composition containing, by mass %, 0.005% to 0.03% of C, 0.17% to 1.0% of Si, 0.05% to 2.0% of Mn, 0.030% or less of P, 0.0002% to 0.0015% of S, 18% to 28% of Cr, 21.5% to 32% of Ni, 0.10% to 2.8% of Mo, 0.05% to 1.19% of Co, 0.01% to 0.25% of Cu, 0.003% to 0.018% of N, 0.10% to 1.0% of Ti, 0.10% to 1.0% of Al, 0.0002% to 0.007% of O, and 0.0010% or less of H, the balance being Fe and inevitable impurities, and satisfying formulae (1) to (4), shown below, $$T1=11\times[\% \text{ N}]+0.1 \tag{1}$$

$$T2=-39\times[\% \text{ N}]+1.0 \tag{2}$$

$$A1=7.5\times[\% \text{ N}]+0.1 \tag{3}$$

$$A2=-42.5\times[\% \text{ N}]+1.0 \tag{4}$$

where [% M] represents content, by mass %, of element M in the alloy, and T1, T2, A1, and A2 satisfy relationships T1<[% Ti]<T2 and A1<[% Al]<A2.

[7] The method of manufacturing an Fe—Ni—Cr alloy according to the foregoing [6], wherein
the chemical composition of the Fe—Ni—Cr alloy is adjusted through refining performed after melting of alloy raw material, and
in the refining, a mixed gas of oxygen and argon is blown into molten alloy resulting from melting of the alloy raw material to perform decarburization, chromium reduction is subsequently performed, and then aluminum, limestone, and fluorite are added to the molten alloy so as to adjust oxygen concentration in the molten alloy to 0.0002% to 0.007% and sulfur concentration in the molten alloy to 0.0002% to 0.0015%, and thereby maintain a N content in the molten alloy of 0.003% to 0.018%.

[8] The method of manufacturing an Fe—Ni—Cr alloy according to the foregoing [6] or [7], wherein
the Fe—Ni—Cr alloy is subjected to hot rolling and cold rolling prior to the blackening treatment.

[9] A method of manufacturing a sheath heater comprising producing a sheath of a sheath heater using an Fe—Ni—Cr alloy obtained by the method of manufacturing an Fe—Ni—Cr alloy according to any one of the foregoing [6] to [8].

Advantageous Effect

According to the present disclosure, it is possible to provide an Fe—Ni—Cr alloy, an Fe—Ni—Cr alloy strip, and a method of manufacturing an Fe—Ni—Cr alloy that have excellent surface characteristics and enable formation of a blackened coating having excellent blackening characteristics and peeling resistance. Moreover, according to the present disclosure, it is possible to provide a sheath heater including a sheath having high emissivity and excellent thermal efficiency, and a method of manufacturing this sheath heater.

DETAILED DESCRIPTION

The following provides a specific description of an embodiment of the present disclosure.

In the following description, the contents of elements in the chemical composition of an Fe—Ni—Cr alloy and the chemical composition of melted alloy raw material (molten alloy) are in units of "mass %" and are indicated simply as "%" unless otherwise specified.

Fe—Ni—Cr Alloy

An Fe—Ni—Cr alloy of the present disclosure has a chemical composition containing, by mass %, 0.005% to 0.03% of C, 0.17% to 1.0% of Si, 0.05% to 2.0% of Mn, 0.030% or less of P, 0.0002% to 0.0015% of S, 18% to 28% of Cr, 21.5% to 32% of Ni, 0.10% to 2.8% of Mo, 0.05% to 1.19% of Co, 0.01% to 0.25% of Cu, 0.003% to 0.018% of N, 0.10% to 1.0% of Ti, 0.10% to 1.0% of Al, 0.0002% to 0.007% of O, and 0.0010% or less of H, the balance being Fe and inevitable impurities, and satisfying formulae (1) to (4), shown below.

As a result of the Fe—Ni—Cr alloy having this configuration, excellent surface characteristics can be obtained and a blackened coating having excellent blackening characteristics and peeling resistance can be formed compared to conventional Fe—Ni—Cr alloys.

The inventors reached the following findings as a result of examining the causes of surface defect formation and blackened coating peeling in conventional Fe—Ni—Cr alloys.

In relation to surface defects of an alloy prior to blackening treatment, the inventors carried out a detailed study of surface defect sections and, as a result, detected nitrides of Al and Ti. This demonstrated that Al and Ti crystallize or precipitate as nitrides during solidification, and that these nitrides remain and later appear as defects at the surface when an inspection is carried out during heat treatment and pickling after hot rolling.

Moreover, in relation to peeling of blackened coatings, the inventors studied the surfaces of sheath heaters having poor appearance due to blackened coating peeling (poor appearance sections). In this study, the inventors detected Ti and Al with greater intensity around the surface of normal sections as compared to poor appearance sections. Moreover, in component analysis performed several microns toward the base material from the surface layer, Ti and Al contents were high, and N content was also high in poor appearance sections compared to normal sections. Based on these findings, the inventors presumed that when the Ti and Al contents are high and the N content is also high, nitrides of Ti and Al form, and thus the amounts of Ti and Al necessary for forming a compact blackened coating having good adhesion cannot be ensured.

Alloy plates having the same chemical compositions as alloys for which blackened coating peeling occurred were used as test materials that were subjected to blackening treatment with a heat treatment temperature of 1010° C., a heat treatment time of 10 minutes, a $N_2$ atmosphere, and a dew point of −20° C. in order to study the relationship between material components and poor blackened coating (note that the chemical composition of the blackened coating was analyzed by glow discharge spectroscopy (GDS) using a Markus-type radio frequency glow discharge optical emission surface analyzer). The N content in the test materials was 0.005% to 0.008% and the Al content in the test materials was 0.28% to 0.30%.

When the Ti contents of post-blackening treatment blackened coatings were compared, the blackened coating Ti content was 1.2% in the case of a test material having a Ti content of 0.08% for which poor appearance was observed, whereas the blackened coating Ti content was 1.9% in the case of a test material having a Ti content of 0.11% and the blackened coating Ti content was 3.1% in the case of a test material having a Ti content of 0.72%, which were test materials for which poor appearance was not observed. Thus, it was confirmed that the blackened coating Ti content tends to be higher in cases in which poor appearance is not observed.

The influence of Al content was evaluated in the same manner by selecting three test materials having N content of 0.006% to 0.009% and Ti content of 0.23% to 0.28%, and, in the same way as for Ti content, it was confirmed that the coating Al content tends to be higher in cases in which poor appearance is not observed. For example, the blackened coating Al content was 1.5% and 0.3% in the case of test materials having Al contents of 0.25% and 0.12%, which were test materials having good appearance, and the blackened coating Al content was 0.1% in the case of a test material having an Al content of 0.08% for which poor appearance was observed.

These experiments suggest that in order to enhance coating characteristics, high Ti content and Al content are required in the coating, and these contents are required to meet specific threshold values.

In regard to metal components other than Al and Ti, the GDS analysis also detected Fe, Cr, Ni, Si, Mn, and Mo, with trace amounts of Co and Cu also detected. The principal non-metal component that was detected was oxygen, with nitrogen also detected. The chemical composition of a coating was determined by a method of determining the weight % from the detection counts of all metal components, oxygen, and nitrogen.

Based on these findings, the inventors conducted diligent research with the aim of enhancing alloy surface characteristics and improving blackening characteristics and inhibiting peeling resistance of a post-blackening treatment blackened coating, and thereby discovered the following.

With regard to the relationship between formation of surface defects and chemical composition of a blackened coating in an Fe—Ni—Cr alloy, the frequency with which defects arise varies greatly depending on N content, even for the same Ti content and Al content. In other words, although defects do not arise when Ti and Al are added to a certain degree so long as the N content is low, defects arise if the N content is higher. From these results, the following formulae were determined as relationships between Ti and Al contents and N content for inhibiting defects. An Fe—Ni—Cr alloy having excellent surface characteristics can be obtained by satisfying these relationships.

$$[\% \text{ Ti}] < -39 \times [\% \text{ N}] + 1.0$$

$$[\% \text{ Al}] < -42.5 \times [\% \text{ N}] + 1.0$$

([% M] represents the content (mass %) of element M in the alloy.)

The inventors also discovered that the relationships between Ti and Al contents and N content in a blackened coating are also important in regard to peeling of the blackened coating. Specifically, as the N content increases, it is necessary to increase the Ti and Al contents in order to form a coating that does not suffer from peeling. From these results, the following formulae were determined as relationships between Ti and Al contents and N content for inhibiting blackened coating peeling. Blackened coating peeling can be effectively inhibited by satisfying these relationships.

$$[\% \text{Ti}] > 11 \times [\% \text{ N}] + 0.1$$

$$[\% \text{Al}] > 7.5 \times [\% \text{ N}] + 0.1$$

Moreover, when improvement of blackening characteristics of a blackened coating is examined, the roles of Ti and Al are as follows. In the case of a typical Fe—Ni—Cr alloy, a coating containing an oxide of (Fe,Ni) and an oxide of Cr is formed at the surface layer when heat treatment is performed. In general, transition metals have a property of variable valence, and it is known that coloring with a color other than black may occur in the case of a coating for which the valence is high, which, in other words, is a coating in which there is greater progression of oxidation. Moreover, it is known that an oxide of divalent Fe is black, an oxide of trivalent Fe is red-brown, an oxide of Ni is black, and an oxide of trivalent Cr is green. Accordingly, when the Fe—Ni—Cr alloy is subjected to blackening treatment, the oxide coating at the surface becomes dark green in color and, in this state, the alloy has an emissivity of less than 0.3, which is not suitable for use in a sheath heater. It is thought that by adding Ti and Al into steel, the valences of oxides of Fe and Cr that are divalent and trivalent can be reduced because Ti and Al have a stronger tendency to be oxidized than Fe, Ni, and Cr.

Specifically, although there are many points that are still unclear, it is thought that when heat treatment is performed under specific conditions, Fe, Ni, and Cr are oxidized, whereas oxides of Fe, Ni, and Cr are reduced to form a coating of NiO and FeO.$Cr_2O_3$, (Fe,Ni)O.$Cr_2O_3$, or (Fe,Ni,Cr)O.$Cr_2O_3$ that is black in color. In this manner, blackening of oxides formed at the surface layer is promoted through a relative reduction in a green component, leading to black color becoming prominent. Moreover, in the case of Si in the Fe—Ni—Cr alloy, a peak is present at a base metal side within the oxide coating. Si is thought to improve adhesion between the oxide coating and the base metal, and contribute to stability of the blackened coating.

Moreover, Ti and Al not only influence the color of the coating, but also influence the thickness of the coating. Ti and Al are readily oxidized elements and are oxidized in an initial stage of blackening treatment to form a compact coating. This coating acts as a protective coating to inhibit subsequent coating growth and thereby enable formation of a thin coating having good adhesion. Consequently, it is necessary for the blackened coating to contain at least a specific amount of Ti and Al (Ti: 1.9% or more; Al: 0.3% or more). Ti content and Al content in the Fe—Ni—Cr alloy are each required to be 0.10% or more in order to obtain a blackened coating having such a chemical composition. However, as previously explained, if N content is not controlled in the same manner as Ti and Al contents, it is not possible to obtain an Fe—Ni—Cr alloy that enables formation of a blackened coating having excellent surface characteristics, blackening characteristics, and peeling resistance. The present disclosure is a result of studies carried out into the relationship between surface characteristics of an alloy and blackening characteristics and peeling resistance of a post-blackening treatment blackened coating with respect to various components, and examination of ranges for which a favorable balance thereof can be achieved with the aim of determining optimal values for controlling the additive amounts of Ti and Al and the amount of N.

As a result, it was determined that a compact blackened coating having high emissivity can be formed without adversely affecting surface characteristics so long as the chemical composition is within the ranges set forth below.

Accordingly, as a result of optimal values being determined for Ti content, Al content, and N content, a requirement is set in the present disclosure that, in addition to constituent elements such as Ti, Al, Cr, and Si being contained in specific amounts, the following formulae (1) to (4) are satisfied in relation to Ti, Al, and N.

$$T1 = 11 \times [\% N] + 0.1 \tag{1}$$

$$T2 = -39 \times [\% N] + 1.0 \tag{2}$$

$$A1 = 7.5 \times [\% N] + 0.1 \tag{3}$$

$$A2 = -42.5 \times [\% N] + 1.0 \tag{4}$$

$$T1 < [\% Ti] < T2$$

$$A1 < [\% Al] < A2$$

Note that [% M] represents the content (mass %) of element M in the alloy.

The following explains each element contained in the Fe—Ni—Cr alloy of the present disclosure.

C: 0.005% to 0.03%

C in the alloy is an element that stabilizes an austenite phase. Moreover, since C has an effect of increasing alloy strength through solid solution strengthening, the C content is required to be 0.005% or more in order to ensure strength at normal temperature and high temperature. On the other hand, C is an element that causes reduction of corrosion resistance or the like by forming a carbide with Cr, which has a large corrosion resistance enhancing effect, and thereby causing a Cr-depleted layer to arise in proximity thereto. Accordingly, the upper limit for the C content is required to be 0.03%. For the same reasons, the C content is preferably within a range of 0.007% to 0.025%, and more preferably within a range of 0.008% to 0.020%.

Si: 0.17% to 1.0%

Si in the alloy is an effective element for improving oxidation resistance, improving adhesion between an oxide coating and base metal, and forming a stable blackened coating. These effects are obtained through inclusion of 0.17% or more of Si. However, excessive addition of Si may result in surface defects caused by inclusions. Accordingly, the upper limit for the Si content is set as 1.0%. For the same reasons, the Si content is preferably 0.19% to 0.80%, and more preferably 0.25% to 0.75%.

Mn: 0.05% to 2.0%

Mn in the alloy is an element that stabilizes an austenite phase and is also an element required for deoxidation. In addition, Mn contributes to improving blackening characteristics and also contributes to improving oxide coating adhesion in conjunction with Si. The Mn content is set as 0.05% or more in order to more reliably obtain these effects. However, excessive addition of Mn leads to reduction of oxidation resistance. Accordingly, the upper limit for the Mn content is set as 2.0%. For the same reasons, the Mn content is preferably within a range of 0.1% to 1.5%, and is more preferably 0.2% to 1.2%.

P: 0.030% or Less

P in the alloy is a harmful element that segregates at grain boundaries and causes cracking during hot working. Accordingly, the P content is preferably reduced as much as possible and is limited to 0.030% or less in the present disclosure. For the same reasons, the P content is preferably 0.028% or less, and more preferably 0.025% or less.

S: 0.0002% to 0.0015%

S in the alloy is a harmful element that segregates at grain boundaries to form a low-melting point compound, and causes hot cracking and the like in manufacturing. Accordingly, the S content is preferably reduced as much as possible and is limited to 0.0015% or less in the present disclosure. For the same reasons, the upper limit for the S content is preferably 0.0013% or less, and more preferably 0.0010% or less.

On the other hand, the S content in the alloy is required to be 0.0002% or more. This is because the N concentration increases in excess of 0.018% in refining if the S content is less than 0.0002%. S is known to act as a surface active element and has a property of concentrating at the surface of molten alloy. Consequently, S has an effect of preventing incorporation of more than 0.015% of N into the molten alloy. For the same reasons, the lower limit of the S content is preferably 0.0003% or more, and more preferably 0.0006% or more.

Cr: 18% to 28%

Cr in the alloy is an effective element for improving corrosion resistance in wet environments. Cr also has an inhibitive effect on corrosion in high-temperature air environments. Note that Cr also has an effect of inhibiting the reduction in corrosion resistance in an oxide film that is formed when the atmosphere and dew point are not controlled in heat treatment such as performed in a manufacturing process of a sheath heater. The Cr content is required to be 18% or more in order to ensure that the effect of improving corrosion resistance in wet environments and high-temperature air environments is reliably obtained. However, inclusion of excessive Cr reduces austenite phase stability and necessitates addition of a large amount of Ni. Accordingly, the upper limit for the Cr content is set as 28%. For the same reasons, the Cr content is preferably within a range of 21% to 26%, and is more preferably 22% to 24%.

Ni: 21.5% to 32%

Ni in the alloy acts as an austenite phase-stabilizing element and is contained in a proportion of 21.5% or more from a viewpoint of structure stability. Ni also has an effect of improving heat resistance and high-temperature strength. However, addition of excessive Ni causes formation of metal Ni in a coating, harms blackening characteristics, and leads to increased raw material cost. Accordingly, the upper limit for the Ni content is set as 32%. For the same reasons, the Ni content is preferably 22% to 28%, and more preferably 24% to 26%.

Mo: 0.10% to 2.8%

Mo in the alloy significantly enhances corrosion resistance under chloride-containing wet environments and high-temperature air environments even when added in a small amount and has an effect of improving corrosion resistance in proportion to the additive amount thereof. Although an effect of improving corrosion resistance when an oxide film is formed in intermediate heat treatment performed in a manufacturing process of a sheath heater is achieved up to a certain content of Mo, inclusion of a large amount of Mo is not effective. Moreover, in an alloy having a high Mo content, the Mo has a negative effect in a high-temperature air environment in a case in which the surface oxygen potential is low because the Mo is preferentially oxidized and causes peeling of the oxide coating. Accordingly, the Mo content is set as 0.10% to 2.8%. For the same reasons, the Mo content is preferably 0.5% to 2.5%, and more preferably 1.0% to 2.0%.

Co: 0.05% to 1.19%

Co is an effective element for stabilizing an austenite phase in the same way as C, N, and Ni. Moreover, in contrast to C and N, which cannot be contained in large amounts because they form carbonitrides with Al, Ti, and the like, and become a cause of surface defects, Co does not form a carbonitride. The Co content is set as 0.05% or more in order to effectively obtain the effect of austenite phase stabilization. However, the upper limit for the Co content is restricted to 1.19% or less because inclusion of excessive Co leads to increased raw material cost. For the same reasons, the Co content is preferably 0.10% to 1.05%, and more preferably 0.15% to 0.95%.

Cu: 0.01% to 0.25%

Cu in the alloy is included as an element for improving corrosion resistance in wet environments, and also for austenite phase stabilization and softening. Therefore, the Cu content is required to be 0.01% or more. However, excessive addition causes formation of a non-uniform coating in a patchy pattern at the material surface and significantly reduces corrosion resistance. Accordingly, the upper limit for the Cu content is restricted to less than 0.25% in the present disclosure. For the same reasons, the Cu content is preferably 0.06% to 0.25%, and more preferably 0.06% to 0.20%.

N: 0.003% to 0.018%

N in the alloy is an element that increases steel corrosion resistance, mechanical attributes, hardness, and so forth. N is also an austenite-producing element that contributes to structure stabilization. Therefore, the N content is required to be 0.003% or higher. An appropriate amount of N becomes included from air during refining, and the N content can be controlled by appropriately adjusting the refining time and optimizing the concentrations of S and O at the molten alloy surface. However, excessive addition of N reduces workability and causes formation of the nitrides MN and TiN when N is contained together with Al and Ti. Consequently, N becomes a cause of surface defects and reduces the additive effect of Al and Ti (i.e., reduces Al and Ti components that are effective for improving blackening characteristics). Accordingly, the upper limit for the N content is set as 0.018%. For the same reasons, the N content is preferably 0.005% to 0.015%, and more preferably 0.006% to 0.013%.

Ti: 0.10% to 1.0%

Ti in the alloy is effective for forming a compact black coating having high emissivity and also fixes C to inhibit deterioration of corrosion resistance. Through a Ti content of 0.10% or more, Ti can contribute to the realization of excellent blackening characteristics (emissivity of 0.3 or more). However, excessive addition of Ti leads to formation of a large amount of nitride and becomes a cause of surface defects. Accordingly, the upper limit for the Ti content is set as 1.0%. For the same reasons, the Ti content is preferably 0.10% to 0.60%, and more preferably 0.10% to 0.50%.

Al: 0.10% to 1.0%

Al in the alloy is a component that is effective as a deoxidizer and is also an element that is effective for forming a compact black coating having high emissivity. Through an Al content of 0.10% or more, O concentration in the alloy can be reduced (reduced to 0.007% or less) and the Al can contribute to the realization of excellent blackening characteristics (emissivity of 0.3 or more), for example. However, excessive Al becomes a cause of surface defects through formation of a large amount of nitride. Accordingly, the upper limit for the Al content is set as 1.0%. For the same reasons, the Al content is preferably within a range of 0.10% to 0.60%, and more preferably within a range of 0.15% to 0.50%.

O: 0.0002% to 0.007%

O in the alloy bonds with Al, Ti, Si, and Mn in molten steel, forms a deoxidation product, and becomes a cause of surface defects. Moreover, in a situation in which O bonds with Al, Ti, and the like, this reduces the effects achieved through inclusion of these elements. Accordingly, the upper limit for the O content is set as 0.007%. For the same reasons, the upper limit for the O content is preferably 0.005%, and more preferably 0.0030%.

On the other hand, the O content in the alloy is required to be 0.0002% or more. This is because the amount of N that becomes incorporated into the molten alloy during refining increases such that the N content in the alloy exceeds 0.018% if the O concentration is less than 0.0002%. O is known to be a surface active element and has a property of concentrating at the surface of molten alloy as previously described for S. Consequently, O has an effect of preventing incorporation of more than 0.018% of N. For the same reasons, the lower limit for the O content is preferably 0.0003%, and more preferably 0.0006%.

H: 0.0010% or Less

When a large amount of H is incorporated into the alloy in melting, cavities are formed in a slab during solidification, and thus H becomes a cause of surface defects. Therefore, it is necessary to strictly restrict the upper limit for the H content to 0.0010%. The H content can be controlled by adjusting the amount of gas when Ar gas is blown during a refining process. For the same reasons, the upper limit for the H content is preferably 0.0008%, and more preferably 0.0006%.

Balance: Fe and Inevitable Impurities

The Fe—Ni—Cr alloy of the present disclosure also contains Fe and inevitable impurities as the balance exclusive of the components described above. However, this is not intended to exclude other elements from being contained so long as they are contained within a range that does not impair the effects of the present disclosure.

As previously explained, the Fe—Ni—Cr alloy of the present disclosure is required to satisfy the following formulae (1) and (2).

$$T1=11\times[\% \text{ N}]+0.1 \tag{1}$$

$$T2=-39\times[\% \text{ N}]+1.0 \tag{2}$$

$$T1<[\% \text{ Ti}]<T2$$

In a case in which formula (1) is not satisfied (i.e., a case in which Ti content is less than or equal to T1 determined by formula (1)), N content in the alloy is excessive, and this N forms a nitride with some of the Ti, which reduces the contribution of Ti to formation of a blackened coating having high adhesion.

Moreover, in a case in which formula (2) in not satisfied (i.e., a case in which Ti content is excessive and is greater than or equal to T2 determined by formula (2)), the formation of surface defects becomes noticeable, and surface characteristics deteriorate.

Therefore, it is necessary for the Ti content to be controlled to within a range for which formulae (1) and (2) are satisfied.

From the same viewpoint, the Ti content preferably satisfies the following formulae (1)' and (2)'.

$$T1=11\times[\% \text{ N}]+0.15 \tag{1)'}$$

$$T2=-39\times[\% \text{ N}]+0.9 \tag{2)'}$$

The Fe—Ni—Cr alloy of the present disclosure is also required to satisfy the following formulae (3) and (4) as previously explained.

$$A1=7.5\times[\% \text{ N}]+0.1 \tag{3}$$

$$A2=-42.5\times[\% \text{ N}]+1.0 \tag{4}$$

$$A1<[\% \text{ Al}]<A2$$

In a case in which formula (3) is not satisfied (i.e., a case in which Al content is less than or equal to Al determined by formula (3)), the additive amount of nitrogen is excessive, some of the added Al forms a nitride, and the contribution of Al to formation of a blackened coating having high adhesion is reduced.

Moreover, in a case in which formula (4) is not satisfied (i.e., a case in which Al content is excessive and is greater than or equal to A2 determined by formula (4)), the formation of surface defects becomes noticeable, and surface characteristics deteriorate.

Therefore, it is necessary for the Al content to be controlled to within a range for which formulae (3) and (4) are satisfied.

From the same viewpoint, the Al content preferably satisfies the following formulae (3)' and (4)'.

$$A1=7.5\times[\% \text{ N}]+0.15 \tag{3)'}$$

$$A2=-42.5\times[\% \text{ N}]+0.9 \tag{4)'}$$

The following describes the blackened coating formed in the Fe—Ni—Cr alloy.

The blackened coating is a coating that is formed by performing specific blackening treatment with respect to the Fe—Ni—Cr alloy of the present disclosure. The blackened coating has a chemical composition containing Fe, Cr, Ni, Si, Mn, Al, Ti, and O, and, by mass %, having a Ti content of 1.9% to 4.5% and an Al content of 0.3% to 3.8%.

Cracking of the blackened coating can be effectively inhibited through inclusion of 1.9% or more of Ti and 0.3% or more of Al in the coating. Note that as a result of GDS analysis of such a blackened coating, Fe, Cr, Ni, Si, Mn, and Mo were detected as metal components, with trace amounts of Co and Cu also detected. The principal non-metal component that was detected was oxygen, with nitrogen also detected. The chemical composition of the coating was determined by a method of determining the mass % from the detection counts of all metal components, oxygen, and nitrogen. Higher Ti and Al contents in the coating are also beneficial for inhibiting peeling of the coating. The lower limit for content in the coating is preferably 2.2% for Ti and 0.9% for Al, and more preferably 2.5% for Ti and 1.5% for Al. Although no specific limitations are placed on the upper limits for the Ti and Al contents, these upper limits are set as 4.5% and 3.8%, respectively, in order that an oxide causes black coloring of the coating becomes a principal component of the coating.

Moreover, the thickness of the blackened coating is not specifically limited and can be altered depending on the intended application. However, a thickness of 0.5 μm or more is preferable for obtaining high emissivity as the blackened coating. On the other hand, an excessively large blackened coating thickness may lead to peeling due to the difference in plastic deformation ability of the coating and the matrix phase. Accordingly, the upper limit for the blackened coating thickness is set as 10 μm. From the same viewpoint, the thickness of the blackened coating is preferably 0.5 μm to 5 μm, and more preferably 0.5 μm to 3 μm.

The emissivity of the blackened coating is preferably 0.3 or more. The emissivity is required to be 0.3 or more in order that the Fe—Ni—Cr alloy in which the blackened coating is formed can be used in a sheath heater, and enables heating with higher efficiency.

A blackened coating having high emissivity can, without any specific limitations, be obtained by a method in which Ti and Al contents in the blackened coating are controlled to within the previously described ranges, for example. A larger value for emissivity of the blackened coating is desirable from a viewpoint of enabling heating with higher efficiency, with a value of 0.4 or more being more preferable, and a value of 0.5 or more being even more preferable.

Method of Manufacturing Fe—Ni—Cr Alloy

The following describes a method of manufacturing an Fe—Ni—Cr alloy of the present disclosure.

The method of manufacturing an Fe—Ni—Cr alloy of the present disclosure includes performing blackening treatment under a set of conditions including a treatment temperature of 900° C. to 1100° C., a dew point of −35° C. to 10° C., and a treatment time of 1 minute to 30 minutes with respect to an Fe—Ni—Cr alloy having a chemical composition containing, by mass %, 0.005% to 0.03% of C, 0.17% to 1.0% of Si, 0.05% to 2.0% of Mn, 0.030% or less of P, 0.0002% to 0.0015% of S, 18% to 28% of Cr, 21.5% to 32% of Ni, 0.10% to 2.8% of Mo, 0.05% to 1.19% of Co, 0.01% to 0.25% of Cu, 0.003% to 0.018% of N, 0.10% to 1.0% of Ti, 0.10% to 1.0% of Al, 0.0002% to 0.007% of O, and 0.0010% or less of H, the balance being Fe and inevitable impurities, and satisfying formulae (1) to (4), shown below.

$$T1 = 11 \times [\% \, N] + 0.1 \quad (1)$$

$$T2 = -39 \times [\% \, N] + 1.0 \quad (2)$$

$$A1 = 7.5 \times [\% \, N] + 0.1 \quad (3)$$

$$A2 = -42.5 \times [\% \, N] + 1.0 \quad (4)$$

([% M] represents the content (mass %) of element M in the alloy, and T1, T2, A1, and A2 satisfy relationships T1<[% Ti]<T2 and A1<[% Al]<A2.)

As a result of the manufacturing method of the present disclosure being configured as described above, it is possible to provide an Fe—Ni—Cr alloy that, compared to conventional Fe—Ni—Cr alloys, has excellent surface characteristics and enables formation of a blackened coating having improved blackening characteristics and peeling resistance.

In the method of manufacturing an Fe—Ni—Cr alloy of the present disclosure, alloy raw materials are melted to obtain molten alloy.

No specific limitations are placed on raw materials that may be used and examples thereof include iron scrap, stainless steel scrap, ferronickel, ferrochrome, and other alloys. The raw materials are melted in a state in which the amounts thereof have been adjusted to satisfy the chemical composition of the target Fe—Ni—Cr alloy.

No specific limitations are placed on the conditions under which the raw materials are melted and commonly known methods may be adopted as appropriate. In one example of such a method, the raw materials are melted using an electric furnace.

Moreover, in the method of manufacturing an Fe—Ni—Cr alloy of the present disclosure, refining is performed to adjust the chemical composition of the molten alloy once the raw materials have been melted.

Commonly known refining methods may be adopted as appropriate in the refining process so long as the chemical composition can be adjusted to enable casting of the Fe—Ni—Cr alloy described below.

Moreover, the N content in the molten alloy can be reduced in this refining by blowing a mixed gas of oxygen and argon into the melted raw materials to perform decarburization, subsequently performing chromium reduction, and then adding aluminum, limestone, and fluorite to the melted raw materials to adjust the concentrations of oxygen and sulfur at the surface of the melted raw materials.

As previously explained, it is extremely important to suppress N content relative to Al and Ti contents in the present disclosure. Consequently, it is necessary to adopt a method for reducing N. By adding aluminum, limestone, and fluorite to the melted raw materials to adjust oxygen concentration in the molten alloy to 0.0002% to 0.007% and adjust sulfur concentration in the molten alloy to 0.0002% to 0.0015%, incorporation of N into the molten alloy from air can be effectively prevented, and N concentration can be reliably controlled to 0.003% to 0.018%.

More specifically, the refining process has a process flow such as described below.

A mixed gas of oxygen and Ar is blown into the molten alloy to perform decarburization by argon oxygen decarburization (AOD) or vacuum oxygen decarburization (VOD).

Thereafter, ferrosilicon alloy and/or Al are added to the molten alloy, Cr reduction is performed, and subsequently limestone, fluorite, and Al are added, and deoxidation and desulfurization are performed (i.e., concentrations of O and S in melted material are appropriately adjusted). The reason for adding limestone, fluorite, and Al is that through formation of CaO—SiO$_2$—Al$_2$O$_3$—MgO—F slag, deoxidation and desulfurization proceed effectively, and concentrations of O and S can be adjusted to within appropriate ranges. Note that dolomite used in AOD or VOD, dolomite arising through erosion from MgO—C bricks or added in order to alleviate brick erosion, or the like may be used as a source of MgO.

The desulfurization and deoxidation reactions mentioned above proceed as in the following reaction formulae.

Deoxidation: 2A̲l̲+3O̲=(Al$_2$O$_3$)

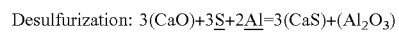

Desulfurization: 3(CaO)+3S̲+2A̲l̲=3(CaS)+(Al$_2$O$_3$)

Note that compounds in parentheses are components in the slag and underlined components are components in the molten alloy.

As can be seen from the reactions in these formulae, the addition of Al and the addition of limestone are important. The CaO concentration in the slag can be adjusted to 40% to 80% in order that these reactions proceed. Moreover, the concentration of Al$_2$O$_3$ in the slag can be adjusted to 5% to 30%.

Another important point in relation to desulfurization and deoxidation is that the additive amount of Al to the molten alloy is set as 1.0% or less. If the additive amount of Al exceeds 1.0%, the concentrations of O and S in the molten alloy both fall to an excessively low level of less than 0.0002%. Consequently, the amount of surface active elements (O and S) in the molten alloy is reduced, and N$_2$ from air is more readily adsorbed at the surface of the molten alloy. In a situation in which an excessive amount of N becomes incorporated from air through the process described above, N concentration in the resultant Fe—Ni—Cr alloy may increase to a level exceeding 0.018%. In this situation, MN and TiN are formed, which not only acts as a cause of surface defects, but also reduces the additive effect of Al and Ti (i.e., negatively affects blackening characteristics). On the other hand, if less than 0.10% of Al is added, O concentration increases to a level exceeding 0.007%, and many oxide-based non-metallic inclusions such as Al$_2$O$_3$ and MgO.Al$_2$O$_3$ are present in the melted raw materials, which of course acts as a cause of surface defects. Moreover, as a result of S concentration also increasing to a level exceeding 0.0015%, hot cracking or the like may occur in manufacturing, and particularly during hot rolling. Therefore, the additive amount of Al in desulfurization and deoxidation is important not only because Al is an important element for improving blackening characteristics, but also for improving surface characteristics of the Fe—Ni—Cr alloy and improving hot workability.

In the method of manufacturing an Fe—Ni—Cr alloy of the present disclosure, an Fe—Ni—Cr alloy having a specific chemical composition may be cast.

The chemical composition of the Fe—Ni—Cr alloy is the same as for the Fe—Ni—Cr alloy of the present disclosure set forth above. No specific limitations are placed on the method by which the Fe—Ni—Cr alloy is cast and commonly known casting methods may be adopted as appropriate. For example, casting may be performed by continuous casting.

Moreover, in the manufacturing method of the present disclosure, the Fe—Ni—Cr alloy may be subjected to hot rolling and cold rolling prior to the subsequently described blackening treatment. By subjecting the Fe—Ni—Cr alloy to hot rolling and cold rolling, the Fe—Ni—Cr alloy can be made into an alloy strip to enable use in sheath heater applications. Furthermore, surface characteristics of the obtained Fe—Ni—Cr alloy can be improved by performing hot rolling and cold rolling. No specific limitations are placed on the detailed conditions of the hot rolling and the cold rolling, which may be performed under commonly known conditions using a hot rolling machine and a cold rolling machine.

The manufacturing method of the present disclosure includes a step of performing blackening treatment with respect to the obtained Fe—Ni—Cr alloy.

The blackening treatment is performed under a set of conditions including a treatment temperature of 900° C. to 1100° C., a dew point of −35° C. to 10° C., and a treatment time of 1 minute to 30 minutes.

By performing the blackening treatment under these conditions, a blackened coating having high blackening characteristics can be formed.

If the treatment temperature in formation of the blackened coating is lower than 900° C., a thin coating is formed, non-uniformity, unevenness, and the like arise, and it is not possible to obtain a good level of emissivity. On the other hand, if the treatment temperature is higher than 1100° C., the chemical composition and thickness of the blackened coating become inappropriate, and problems may arise in terms of peeling resistance. Therefore, the treatment temperature is 900° C. to 1100° C., preferably 950° C. to 1050° C., and more preferably 975° C. to 1025° C.

The treatment time (holding time) in the blackening treatment is set as 1 minute to 30 minutes. If the treatment time is shorter than 1 minute, formation of the blackened coating is insufficient and the desired blackening characteristics cannot be obtained. On the other hand, peeling resistance decreases if the treatment time is longer than 30 minutes. Therefore, the treatment is required to be for 1 minute to 30 minutes, preferably 2 minutes to 15 minutes, and more preferably 3 minutes to 10 minutes.

Control of the treatment atmosphere in the blackening treatment is also important, and it is necessary to inhibit excessive oxidation. For this reason, an atmosphere having nitrogen or an inert gas such as argon or helium as a principal component is required. The use of nitrogen is preferable when taking manufacturing cost into account. The degree of oxidation is most economically set by controlling the dew point. If the dew point is higher than 10° C., excessive oxidation occurs, coating characteristics deteriorate, and peeling characteristics do not meet the demanded level, whereas if the dew point is lower than −35° C., sufficient oxidation does not occur, blackening characteristics do not meet the demanded level, and nitriding may occur. Therefore, the dew point in the blackening treatment is required to be controlled to within a range of −35° C. to 10° C., preferably −30° C. to 0° C., and more preferably −25° C. to −10° C.

Fe—Ni—Cr Alloy Strip

An Fe—Ni—Cr alloy strip of the present disclosure contains the Fe—Ni—Cr alloy of the present disclosure set forth above.

By forming the strip using the Fe—Ni—Cr alloy of the present disclosure, it is possible to obtain an Fe—Ni—Cr alloy strip that enables formation of a blackened coating having excellent alloy surface properties, blackening characteristics, and peeling resistance. When the Fe—Ni—Cr alloy strip of the present disclosure is used in a sheath of a sheath heater, effects of increased emissivity and improved thermal efficiency can be achieved.

Although no specific limitations are placed on the method by which the Fe—Ni—Cr alloy strip of the present disclosure is obtained from the Fe—Ni—Cr alloy of the present disclosure, the Fe—Ni—Cr alloy strip can be obtained, for example, by performing hot rolling and cold rolling as previously described. The alloy strip may be worked as appropriate depending on the intended application thereof. For example, in a case in which the alloy strip is to be used in a sheath of a sheath heater described below, the alloy strip may be formed into a tubular shape (pipe-making).

Sheath Heater and Method of Manufacturing Sheath Heater

A sheath heater of the present disclosure includes the Fe—Ni—Cr alloy of the present disclosure set forth above as a sheath.

By forming the sheath from the Fe—Ni—Cr alloy of the present disclosure, effects of improving emissivity of the sheath and enabling production of a sheath heater having improved thermal efficiency can be achieved.

A method of manufacturing a sheath heater of the present disclosure includes forming a sheath using an Fe—Ni—Cr alloy obtained by the method of manufacturing an Fe—Ni—Cr alloy of the present disclosure set forth above.

By forming the sheath from an Fe—Ni—Cr alloy obtained by the manufacturing method of the present disclosure, an effect of enabling production of a sheath heater having high thermal efficiency and including a sheath having high emissivity can be achieved.

A sheath heater normally has a structure in which nichrome wire is enclosed within a metal tube. Herein, the "sheath" of the sheath heater refers to the metal tube in which the nichrome wire is enclosed.

EXAMPLES

The following provides a more specific description of the present disclosure through examples.

Example 1

Fe—Ni—Cr Alloy Samples 1 to 39

For each Fe—Ni—Cr alloy used as a sample, raw materials such as scrap, nickel, chromium, and molybdenum were first melted in a 60 t electric furnace, and then a mixed gas of oxygen and argon was blown into the melted raw materials to perform decarburization by AOD (all samples other than samples 6 and 20) or VOD (samples 6 and 20).

Thereafter, ferrosilicon alloy and aluminum were added, Cr reduction was performed, and then limestone, fluorite, and aluminum were added to perform deoxidation and desulfurization. The melted raw materials that had undergone compositional adjustment were cast as an Fe—Ni—Cr alloy slab of 200 mm in thickness by 1,000 mm in width through continuous casting.

The surface of the obtained slab was subsequently subjected to grinding. The slab was heated to a temperature of 1000° C. to 1300° C. (1200° C. for samples 1 to 15, 1100° C. for samples 16 to 18, and 1150° C. for samples 19 to 39), and was subsequently hot rolled to obtain a hot rolled strip of 3 mm in thickness that was subsequently subjected to annealing and pickling. Thereafter, the strip was cold rolled to obtain an alloy strip of 0.7 mm in thickness. The alloy strip was subjected to further annealing and pickling to obtain a rolled annealed strip for use as an Fe—Ni—Cr alloy strip sample. The chemical composition of each of the obtained samples is shown in Table 1 together with values (T1, T2, A1, and A2) obtained from formulae (1) to (4).

The obtained samples were evaluated as described below.

(1) Evaluation of Surface Characteristics

The surface appearance of each obtained sample was evaluated. An evaluation of "poor" was given in a case in which 20 or more defects having a length of 20 mm or more were observed within a strip length of 1,000 m, an evaluation of "satisfactory" was given when the number of such defects was at least 15 and less than 20, an evaluation of "good" was given when the number of such defects was at least 10 and less than 15, and an evaluation of "excellent" was given when the number of such defects was less than 10. The evaluation results are shown in Table 1.

(2) Evaluation of Blackening Characteristics of Blackened Coating

A 25 mm×50 mm test piece was taken from each of the obtained samples. The surface of the test piece was subjected to wet polishing using #800 emery paper. Thereafter, a blackened coating was formed at the surface of the test piece through heat treatment performed for 10 minutes at 1010° C. in a nitrogen gas atmosphere in which the dew point was adjusted to −20° C. Ti and Al contents in the formed blackened coating were measured by analysis by GDS (Markus-type radio frequency glow discharge optical emission surface analyzer). Moreover, a cross-section sample including coating and matrix phase was prepared using a focused ion beam (FIB) device, and then the thickness of the blackened coating was measured through observation using a field-emission scanning electron microscope (FE-SEM). The measured Al and Ti contents in the blackened coating and thickness of the blackened coating are shown in Table 1.

Emissivity of the formed blackened coating was subsequently measured using an emissivity meter (TSS-5X produced by Japan Sensor Corporation). Blackening characteristics were evaluated as "excellent" for an emissivity of 0.5 or more, "good" for an emissivity of more than 0.4 and less than 0.5, "satisfactory" for an emissivity of at least 0.3 and less than 0.4, and "poor" for an emissivity of less than 0.3. The evaluation results are shown in Table 1.

(3) Evaluation of Peeling Resistance of Blackened Coating

A 10 mm×100 mm test piece was taken from each of the obtained samples. The surface of the test piece was subjected to wet polishing using #800 emery paper. Thereafter, a blackened coating was formed at the surface of the test piece through heat treatment performed for 10 minutes at 1010° C. in a nitrogen gas atmosphere in which the dew point was adjusted to −20° C.

The test piece was then subjected to 90° bending and 120° bending once. After this bending, the surface of the test piece was observed using a microscope at ×10 magnification to evaluate whether peeling of the blackened coating had occurred. An evaluation of "poor" was given in a case in which peeling occurred through 90° bending, an evaluation of "good" was given in a case in which peeling did not occur through 90° bending but did occur through 120° bending, and an evaluation of "excellent" was given in a case in which peeling did not occur for either bending angle. The evaluation results are shown in Table 1.

TABLE 1

| Sample | Chemical composition of alloy | | | | | | | | | | | | | | |
|---|---|---|---|---|---|---|---|---|---|---|---|---|---|---|---|
| | C | Si | Mn | P | S | Cr | Ni | Mo | Co | Cu | N | Ti | Al | O | H |
| 1 Example | 0.006 | 0.18 | 1.92 | 0.027 | 0.0008 | 22.20 | 30.22 | 1.25 | 1.18 | 0.04 | 0.003 | 0.84 | 0.36 | 0.0010 | 0.0004 |
| 2 Example | 0.017 | 0.33 | 0.70 | 0.022 | 0.0014 | 23.89 | 25.41 | 0.13 | 1.05 | 0.24 | 0.017 | 0.31 | 0.25 | 0.0051 | 0.0003 |
| 3 Example | 0.021 | 0.18 | 0.49 | 0.024 | 0.0008 | 22.61 | 29.29 | 0.36 | 0.49 | 0.22 | 0.003 | 0.58 | 0.54 | 0.0020 | 0.0009 |
| 4 Example | 0.005 | 0.95 | 1.71 | 0.022 | 0.0006 | 18.09 | 21.88 | 2.75 | 0.38 | 0.02 | 0.003 | 0.33 | 0.79 | 0.0018 | 0.0010 |
| 5 Example | 0.029 | 0.81 | 1.66 | 0.030 | 0.0013 | 27.93 | 31.74 | 2.33 | 0.85 | 0.16 | 0.004 | 0.73 | 0.66 | 0.0022 | 0.0004 |
| 6 Example | 0.026 | 0.51 | 0.19 | 0.023 | 0.0009 | 23.56 | 24.35 | 2.05 | 0.89 | 0.18 | 0.016 | 0.29 | 0.28 | 0.0044 | 0.0005 |
| 7 Example | 0.011 | 0.67 | 0.33 | 0.022 | 0.0008 | 22.02 | 24.95 | 1.34 | 1.04 | 0.07 | 0.014 | 0.29 | 0.32 | 0.0007 | 0.0004 |
| 8 Example | 0.015 | 0.51 | 0.67 | 0.029 | 0.0011 | 24.83 | 25.13 | 0.59 | 0.25 | 0.13 | 0.005 | 0.28 | 0.57 | 0.0014 | 0.0004 |
| 9 Example | 0.009 | 0.37 | 1.10 | 0.018 | 0.0013 | 23.91 | 24.91 | 1.76 | 0.99 | 0.15 | 0.015 | 0.34 | 0.23 | 0.0006 | 0.0007 |
| 10 Example | 0.018 | 0.29 | 0.56 | 0.020 | 0.0011 | 21.47 | 25.30 | 1.95 | 0.51 | 0.22 | 0.005 | 0.59 | 0.55 | 0.0049 | 0.0008 |
| 11 Example | 0.021 | 0.77 | 0.61 | 0.011 | 0.0018 | 25.41 | 26.52 | 2.41 | 1.01 | 0.14 | 0.005 | 0.64 | 0.75 | 0.0017 | 0.0002 |
| 12 Example | 0.022 | 0.79 | 0.89 | 0.018 | 0.0012 | 21.11 | 27.77 | 0.88 | 0.78 | 0.23 | 0.005 | 0.72 | 0.29 | 0.0012 | 0.0003 |
| 13 Example | 0.018 | 0.52 | 1.11 | 0.024 | 0.0009 | 23.51 | 24.20 | 1.94 | 0.15 | 0.06 | 0.009 | 0.45 | 0.20 | 0.0005 | 0.0002 |
| 14 Example | 0.015 | 0.72 | 0.51 | 0.010 | 0.0008 | 23.88 | 25.31 | 1.25 | 0.16 | 0.06 | 0.006 | 0.69 | 0.73 | 0.0020 | 0.0003 |
| 15 Example | 0.019 | 0.59 | 1.91 | 0.021 | 0.0003 | 23.81 | 25.77 | 1.57 | 0.44 | 0.09 | 0.012 | 0.36 | 0.27 | 0.0018 | 0.0003 |
| 16 Example | 0.009 | 0.33 | 0.92 | 0.009 | 0.0007 | 23.01 | 24.02 | 1.50 | 0.87 | 0.06 | 0.011 | 0.51 | 0.51 | 0.0023 | 0.0004 |
| 17 Example | 0.010 | 0.27 | 0.86 | 0.003 | 0.0006 | 22.90 | 25.88 | 1.01 | 0.55 | 0.07 | 0.010 | 0.30 | 0.30 | 0.0007 | 0.0005 |
| 18 Example | 0.012 | 0.68 | 0.73 | 0.018 | 0.0003 | 22.04 | 24.59 | 1.76 | 0.62 | 0.08 | 0.007 | 0.49 | 0.25 | 0.0010 | 0.0002 |
| 19 Example | 0.008 | 0.45 | 0.42 | 0.020 | 0.0008 | 22.56 | 25.08 | 1.89 | 0.79 | 0.07 | 0.008 | 0.65 | 0.63 | 0.0015 | 0.0002 |
| 20 Example | 0.016 | 0.54 | 0.57 | 0.009 | 0.0004 | 22.82 | 24.75 | 1.86 | 0.90 | 0.09 | 0.009 | 0.21 | 0.36 | 0.0022 | 0.0005 |
| 21 Example | 0.013 | 0.37 | 0.78 | 0.023 | 0.0004 | 22.38 | 25.93 | 1.12 | 0.22 | 0.12 | 0.010 | 0.42 | 0.19 | 0.0027 | 0.0004 |
| 22 Example | 0.014 | 0.41 | 0.33 | 0.009 | 0.0005 | 22.83 | 25.43 | 1.21 | 0.19 | 0.10 | 0.007 | 0.71 | 0.44 | 0.0012 | 0.0003 |
| 23 Example | 0.017 | 0.42 | 0.38 | 0.022 | 0.0005 | 23.29 | 24.99 | 1.55 | 0.26 | 0.10 | 0.010 | 0.53 | 0.50 | 0.0019 | 0.0003 |

TABLE 1-continued

| | Sample | | | | | | | | | | | | | | | |
|---|---|---|---|---|---|---|---|---|---|---|---|---|---|---|---|---|
| 24 | Example | 0.015 | 0.66 | 0.54 | 0.019 | 0.0003 | 22.03 | 24.22 | 1.24 | 0.35 | 0.14 | 0.009 | 0.58 | 0.57 | 0.0060 | 0.0006 |
| 25 | Comparative example | 0.019 | 0.41 | 0.42 | 0.035 | 0.0009 | 22.01 | 23.70 | 1.19 | 0.21 | 0.10 | 0.009 | 0.35 | 0.38 | 0.0010 | 0.0002 |
| 26 | Comparative example | 0.010 | 0.45 | 1.11 | 0.014 | 0.0019 | 23.44 | 25.49 | 1.70 | 0.81 | 0.09 | 0.012 | 0.45 | 0.34 | 0.0015 | 0.0002 |
| 27 | Comparative example | 0.012 | 0.27 | 0.73 | 0.021 | 0.0008 | 23.19 | 24.11 | 1.44 | 0.58 | 0.10 | 0.020 | 0.48 | 0.42 | 0.0017 | 0.0003 |
| 28 | Comparative example | 0.017 | 0.42 | 0.89 | 0.023 | 0.0005 | 22.90 | 24.56 | 1.56 | 0.16 | 0.09 | 0.012 | 0.49 | 1.05 | 0.0010 | 0.0002 |
| 29 | Comparative example | 0.016 | 0.45 | 1.00 | 0.019 | 0.009 | 22.30 | 25.11 | 1.89 | 0.22 | 0.05 | 0.011 | 1.04 | 0.39 | 0.0010 | 0.0002 |
| 30 | Comparative example | 0.008 | 0.42 | 0.98 | 0.022 | 0.0005 | 23.07 | 24.56 | 1.22 | 0.15 | 0.09 | 0.010 | 0.76 | 0.48 | 0.0019 | 0.0003 |
| 31 | Comparative example | 0.017 | 0.36 | 0.50 | 0.024 | 0.0005 | 22.90 | 24.56 | 1.35 | 0.36 | 0.07 | 0.009 | 0.35 | 0.77 | 0.0020 | 0.0003 |
| 32 | Comparative example | 0.014 | 0.33 | 0.21 | 0.024 | 0.0008 | 22.93 | 25.61 | 1.56 | 0.22 | 0.09 | 0.013 | 0.38 | 0.39 | 0.0012 | 0.0013 |
| 33 | Comparative example | 0.014 | 0.58 | 0.84 | 0.018 | 0.0006 | 22.51 | 25.70 | 1.22 | 0.48 | 0.06 | 0.005 | 0.34 | 0.070 | 0.0012 | 0.0003 |
| 34 | Comparative example | 0.009 | 0.29 | 0.68 | 0.021 | 0.0003 | 23.56 | 24.70 | 1.60 | 0.88 | 0.08 | 0.004 | 0.06 | 0.29 | 0.0018 | 0.0003 |
| 35 | Comparative example | 0.015 | 0.61 | 0.86 | 0.021 | 0.003 | 22.54 | 25.70 | 1.60 | 0.93 | 0.06 | 0.013 | 0.19 | 0.32 | 0.0015 | 0.0002 |
| 36 | Comparative example | 0.016 | 0.38 | 0.22 | 0.021 | 0.0008 | 22.88 | 25.77 | 1.60 | 0.61 | 0.07 | 0.013 | 0.41 | 0.16 | 0.0012 | 0.0003 |
| 37 | Comparative example | 0.010 | 0.31 | 0.75 | 0.021 | 0.0001 | 23.21 | 24.13 | 1.48 | 0.53 | 0.11 | 0.020 | 0.48 | 1.18 | 0.0001 | 0.0003 |
| 38 | Comparative example | 0.015 | 0.40 | 0.98 | 0.023 | 0.0001 | 22.09 | 24.55 | 1.66 | 0.19 | 0.09 | 0.023 | 0.51 | 1.05 | 0.0001 | 0.0002 |
| 39 | Comparative example | 0.014 | 0.02 | 0.81 | 0.018 | 0.0025 | 22.15 | 25.74 | 1.21 | 0.44 | 0.06 | 0.001 | 0.34 | 0.008 | 0.0090 | 0.0003 |

| | | Formulae (1) to (4) | | | | Blackened coating | | | Evaluation | | |
|---|---|---|---|---|---|---|---|---|---|---|---|
| | Sample | T1 | T2 | A1 | A2 | Ti content | Al content | Thickness (μm) | Surface characteristics | Blackening characteristics | Peeling resistance |
| 1 | Example | 0.13 | 0.88 | 0.12 | 0.87 | 3.1 | 0.6 | 2.3 | Excellent | Excellent | Excellent |
| 2 | Example | 0.29 | 0.34 | 0.23 | 0.28 | 1.5 | 0.2 | 0.5 | Satisfactory | Satisfactory | Good |
| 3 | Example | 0.13 | 0.88 | 0.12 | 0.87 | 2.7 | 1.5 | 0.9 | Excellent | Good | Excellent |
| 4 | Example | 0.13 | 0.88 | 0.12 | 0.87 | 2.0 | 3.8 | 0.6 | Excellent | Excellent | Excellent |
| 5 | Example | 0.14 | 0.84 | 0.13 | 0.83 | 3.3 | 2.2 | 1.6 | Excellent | Excellent | Excellent |
| 6 | Example | 0.28 | 0.38 | 0.22 | 0.32 | 1.3 | 0.2 | 0.4 | Satisfactory | Satisfactory | Good |
| 7 | Example | 0.25 | 0.45 | 0.21 | 0.41 | 2.5 | 0.7 | 4.0 | Good | Good | Excellent |
| 8 | Example | 0.16 | 0.81 | 0.14 | 0.79 | 2.1 | 1.4 | 3.0 | Excellent | Good | Excellent |
| 9 | Example | 0.27 | 0.42 | 0.21 | 0.36 | 1.3 | 0.2 | 0.3 | Satisfactory | Satisfactory | Good |
| 10 | Example | 0.16 | 0.81 | 0.14 | 0.79 | 2.6 | 1.4 | 1.0 | Excellent | Excellent | Excellent |
| 11 | Example | 0.16 | 0.81 | 0.14 | 0.79 | 2.4 | 3.3 | 1.0 | Excellent | Excellent | Excellent |
| 12 | Example | 0.16 | 0.81 | 0.14 | 0.79 | 3.2 | 0.7 | 4.2 | Good | Excellent | Excellent |
| 13 | Example | 0.20 | 0.65 | 0.17 | 0.62 | 2.6 | 0.5 | 1.1 | Excellent | Good | Excellent |
| 14 | Example | 0.17 | 0.77 | 0.15 | 0.75 | 3.5 | 2.6 | 8.3 | Excellent | Excellent | Excellent |
| 15 | Example | 0.23 | 0.53 | 0.19 | 0.49 | 2.3 | 0.3 | 3.1 | Good | Good | Excellent |
| 16 | Example | 0.22 | 0.57 | 0.18 | 0.53 | 2.5 | 1.4 | 1.5 | Excellent | Excellent | Excellent |
| 17 | Example | 0.21 | 0.61 | 0.18 | 0.58 | 2.5 | 0.8 | 2.7 | Excellent | Good | Excellent |
| 18 | Example | 0.18 | 0.73 | 0.15 | 0.70 | 3.0 | 0.5 | 6.1 | Excellent | Good | Excellent |
| 19 | Example | 0.19 | 0.69 | 0.16 | 0.66 | 2.6 | 1.8 | 0.7 | Excellent | Excellent | Excellent |
| 20 | Example | 0.20 | 0.65 | 0.17 | 0.62 | 1.9 | 0.8 | 2.1 | Excellent | Satisfactory | Good |
| 21 | Example | 0.21 | 0.61 | 0.18 | 0.58 | 2.2 | 0.5 | 7.4 | Good | Good | Good |
| 22 | Example | 0.18 | 0.73 | 0.15 | 0.70 | 4.5 | 1.0 | 3.2 | Excellent | Excellent | Excellent |
| 23 | Example | 0.21 | 0.61 | 0.18 | 0.58 | 2.9 | 1.4 | 1.5 | Excellent | Excellent | Excellent |
| 24 | Example | 0.20 | 0.65 | 0.17 | 0.62 | 3.1 | 1.8 | 1.3 | Excellent | Excellent | Excellent |
| 25 | Comparative example | 0.20 | 0.65 | 0.17 | 0.62 | 2.4 | 0.6 | 2.0 | Poor | Good | Excellent |
| 26 | Comparative example | 0.23 | 0.53 | 0.19 | 0.49 | 2.6 | 0.8 | 2.4 | Poor | Good | Excellent |
| 27 | Comparative example | 0.32 | 0.22 | 0.25 | 0.15 | 2.2 | 1.0 | 1.9 | Poor | Good | Excellent |
| 28 | Comparative example | 0.23 | 0.53 | 0.19 | 0.49 | 2.6 | 4.7 | 0.6 | Poor | Excellent | Excellent |
| 29 | Comparative example | 0.22 | 0.57 | 0.18 | 0.53 | 4.4 | 0.8 | 2.9 | Poor | Excellent | Excellent |
| 30 | Comparative example | 0.21 | 0.61 | 0.18 | 0.58 | 3.2 | 1.0 | 1.9 | Poor | Excellent | Excellent |
| 31 | Comparative example | 0.20 | 0.65 | 0.17 | 0.62 | 2.4 | 3.6 | 0.7 | Poor | Excellent | Excellent |
| 32 | Comparative example | 0.24 | 0.49 | 0.20 | 0.45 | 2.8 | 1.1 | 3.5 | Poor | Good | Excellent |
| 33 | Comparative example | 0.16 | 0.81 | 0.14 | 0.79 | 2.2 | 0.1 | 10.9 | Excellent | Poor | Poor |
| 34 | Comparative example | 0.14 | 0.84 | 0.13 | 0.83 | 0.7 | 0.6 | 2.7 | Excellent | Poor | Poor |
| 35 | Comparative example | 0.24 | 0.49 | 0.20 | 0.45 | 0.6 | 0.7 | 2.4 | Excellent | Poor | Poor |
| 36 | Comparative example | 0.24 | 0.49 | 0.20 | 0.45 | 2.6 | 0.05 | 5.7 | Excellent | Satisfactory | Poor |
| 37 | Comparative example | 0.32 | 0.22 | 0.25 | 0.15 | 2.2 | 10.0 | 0.3 | Poor | Good | Excellent |
| 38 | Comparative example | 0.35 | 0.10 | 0.27 | 0.02 | 2.6 | 4.5 | 0.5 | Poor | Good | Excellent |
| 39 | Comparative example | 0.11 | 0.96 | 0.11 | 0.96 | 2.2 | 0.05 | 35.0 | Poor | Poor | Poor |

It can be seen from Table 1 that good results were obtained for surface characteristics, blackening characteristics, and peeling resistance of samples 1 to 24, which conformed with the present disclosure.

In contrast, in the case of comparative example samples 25 and 26, defects occurred and surface characteristics had poorer results because P and S contents did not conform with the present disclosure.

Likewise, in the case of comparative example samples 27 to 29, defects formed more frequently and surface characteristics had poorer results because N, Al, and Ti contents were higher than stipulated in the present disclosure. The reason for these results is nitride formation. Although N, Al, and Ti contents conformed with the present disclosure in the case of comparative example samples 30 and 31, surface characteristics were poor because formulae (2) and (4) were not satisfied.

In the case of comparative example sample 32, numerous bubble defects arose in the slab, leading eventually to the formation of many surface defects, and surface characteristics were poor because H content did not conform with the present disclosure.

In the case of comparative example samples 33 and 34, a sound coating was not formed, and blackening characteristics and peeling characteristics were poor because Al and Ti contents were low and did not conform with the present disclosure. The reason for these results is thought to be that the coating had low Ti content or Al content, and thus was not formed with an appropriate thickness.

Although Ti and Al contents conformed with the present disclosure in the case of comparative example samples 35 and 36, the amounts of Ti and Al in the coating were low, and blackening characteristics and peeling characteristics were poor because formulae (1) and (3) expressing relationships with nitrogen content were not satisfied.

In the case of comparative example samples 37 and 38, O concentration and S concentration were both at a very low level of 0.0001% because Al concentration exceeded 1.0%, and this resulted in high N content. Consequently, results caused by nitrides occurred, and surface characteristics deteriorated. In the case of comparative example sample 39, O concentration and S concentration were excessively high due to low Si concentration and Al concentration, and consequently N content also fell below the lower limit. This resulted in defects forming more frequently due to the high S concentration and also resulted in poor blackening characteristics and peeling characteristics due to the low Al concentration.

Example 2

Samples 5-1 to 5-11 Having Altered Blackening Treatment Conditions

With respect to Fe—Ni—Cr alloy sample 5 prepared in Example 1, blackening treatment was performed under sets of conditions (treatment temperature, treatment time, atmosphere, and dew point) shown in Table 2 to form blackened coatings and thereby obtain Fe—Ni—Cr alloy samples that each included a blackened coating. The Al and Ti contents in the blackened coating and the thickness of the blackened coating for each of the obtained samples are shown in Table 2.

Moreover, (2) blackening characteristics and (3) peeling resistance of each of the obtained samples were evaluated under the same conditions as in Example 1. The evaluation results are shown in Table 2.

TABLE 2

| | | Blackening treatment conditions | | | | Blackened coating | | | Evaluation | |
| --- | --- | --- | --- | --- | --- | --- | --- | --- | --- | --- |
| | Sample | Treatment temperature (° C.) | Treatment time (min) | Atmosphere | Dew point | Ti content | Al content | Thickness (μm) | Blackening characteristics | Peeling resistance |
| 5 | Example | 1010 | 10 | Nitrogen | −20° C. | 3.3 | 2.2 | 1.6 | Excellent | Excellent |
| 5-1 | Example | 900 | 10 | Nitrogen | −20° C. | 2.0 | 0.5 | 2.2 | Good | Excellent |
| 5-2 | Example | 1100 | 10 | Nitrogen | −20° C. | 3.4 | 1.1 | 5.6 | Excellent | Good |
| 5-3 | Example | 1010 | 1 | Nitrogen | −20° C. | 2.1 | 0.6 | 2.6 | Good | Excellent |
| 5-4 | Example | 1010 | 30 | Nitrogen | −20° C. | 3.0 | 1.3 | 5.1 | Excellent | Good |
| 5-5 | Example | 1010 | 1 | Nitrogen | 10° C. | 2.9 | 1.5 | 5.5 | Excellent | Good |
| 5-6 | Example | 1010 | 10 | Nitrogen | −30° C. | 1.9 | 0.4 | 2.7 | Good | Excellent |
| 5-7 | Comparative example | 850 | 10 | Nitrogen | −20° C. | 1.0 | 0.2 | 0.3 | Poor | Good |
| 5-8 | Comparative example | 1130 | 10 | Nitrogen | −20° C. | 3.1 | 1.0 | 10.5 | Good | Poor |
| 5-9 | Comparative example | 1010 | 44 | Nitrogen | −20° C. | 2.0 | 0.8 | 11.6 | Good | Poor |
| 5-10 | Comparative example | 1010 | 10 | Nitrogen | 15° C. | 1.5 | 0.6 | 13.6 | Good | Poor |
| 5-11 | Comparative example | 1010 | 10 | Nitrogen | −40° C. | 1.3 | 0.2 | 0.4 | Poor | Good |

It can be seen from Table 2 that even when the treatment temperature, treatment time, and dew point were altered, good blackening characteristics and peeling characteristics were achieved so long as the conditions conformed with the present disclosure (samples 5-1 to 5-6).

In contrast, it can be seen that coating formation was insufficient and blackening characteristics were inadequate in the case of comparative example sample 5-7 for which the heat treatment temperature was low and comparative example sample 5-11 for which the dew point was low. Moreover, it can be seen that although blackening characteristics were adequate in the case of comparative example sample 5-8 for which the heat treatment temperature was high, comparative example sample 5-9 for which the holding time was long, and comparative example sample 5-10 for which the dew point was high, peeling of the coating occurred for these samples, and thus peeling resistance was poor.

INDUSTRIAL APPLICABILITY

According to the present disclosure, it is possible to provide an Fe—Ni—Cr alloy, an Fe—Ni—Cr alloy strip, and a method of manufacturing an Fe—Ni—Cr alloy that enable formation of a blackened coating having excellent surface characteristics, blackening characteristics, and peeling resistance, and also to provide a sheath heater including a sheath having high emissivity and excellent thermal efficiency, and a method of manufacturing this sheath heater.

The invention claimed is:

1. An Fe—Ni—Cr alloy comprising a chemical composition containing, by mass %, 0.005% to 0.03% of C, 0.17% to 1.0% of Si, 0.05% to 2.0% of Mn, 0.030% or less of P, 0.0002% to 0.0015% of S, 18% to 28% of Cr, 21.5% to 28% of Ni, 0.10% to 2.8% of Mo, 0.05% to 1.19% of Co, 0.01% to 0.25% of Cu, 0.003% to 0.018% of N, 0.10% to 1.0% of Ti, 0.10% to 1.0% of Al, 0.0002% to 0.007% of O, and 0.0010% or less of H, the balance being Fe and inevitable impurities, and satisfying formulae (1) to (4), shown below, $$T1 = 11 \times [\% \text{ N}] + 0.1 \tag{1}$$

$$T2 = -39 \times [\% \text{ N}] + 0.9 \tag{2)'}$$

$$A1 = 7.5 \times [\% \text{ N}] + 0.1 \tag{3}$$

$$A2 = -42.5 \times [\% \text{ N}] + 1.0 \tag{4}$$

where [% M] represents content, by mass %, of element M in the alloy, and T1, T2, A1, and A2 satisfy relationships T1<[% Ti]<T2 and A1<[% Al]<A2.

2. The Fe—Ni—Cr alloy according to claim 1, wherein
the Fe—Ni—Cr alloy has a blackened coating at a surface thereof,
the blackened coating contains Fe, Cr, Ni, Si, Mn, Al, Ti, and O, and, by mass %, has a Ti content of 1.9% to 4.5% and an Al content of 0.3% to 3.8%, and
the blackened coating has a thickness of 0.5 μm to 10 μm.

3. The Fe—Ni—Cr alloy according to claim 2, wherein the blackened coating has an emissivity of 0.3 or more.

4. An Fe—Ni—Cr alloy strip comprising the Fe—Ni—Cr alloy according to claim 1.

5. A sheath heater comprising the Fe—Ni—Cr alloy according to claim 1 as a sheath.

6. A method of manufacturing an Fe—Ni—Cr alloy comprising performing blackening treatment under a set of conditions including a treatment temperature of 900° C. to 1100° C., a dew point of −35° C. to 10° C., and a treatment time of 1 minute to 30 minutes with respect to an Fe—Ni—Cr alloy comprising a chemical composition containing, by mass %, 0.005% to 0.03% of C, 0.17% to 1.0% of Si, 0.05% to 2.0% of Mn, 0.030% or less of P, 0.0002% to 0.0015% of S, 18% to 28% of Cr, 21.5% to 28% of Ni, 0.10% to 2.8% of Mo, 0.05% to 1.19% of Co, 0.01% to 0.25% of Cu, 0.003% to 0.018% of N, 0.10% to 1.0% of Ti, 0.10% to 1.0% of Al, 0.0002% to 0.007% of O, and 0.0010% or less of H, the balance being Fe and inevitable impurities, and satisfying formulae (1) to (4), shown below, $$T1 = 11 \times [\% \text{ N}] + 0.1 \tag{1}$$

$$T2 = -39 \times [\% \text{ N}] + 0.9 \tag{2)'}$$

$$A1 = 7.5 \times [\% \text{ N}] + 0.1 \tag{3}$$

$$A2 = -42.5 \times [\% \text{ N}] + 1.0 \tag{4}$$

where [% M] represents content, by mass %, of element M in the alloy, and T1, T2, A1, and A2 satisfy relationships T1<[% Ti]<T2 and A1<[% Al]<A2.

7. The method of manufacturing an Fe—Ni—Cr alloy according to claim 6, wherein
the chemical composition of the Fe—Ni—Cr alloy is adjusted through refining performed after melting of alloy raw material, and
in the refining, a mixed gas of oxygen and argon is blown into molten alloy resulting from melting of the alloy raw material to perform decarburization, chromium reduction is subsequently performed, and then aluminum, limestone, and fluorite are added to the molten alloy so as to adjust oxygen concentration in the molten alloy to 0.0002% to 0.007% and sulfur concentration in the molten alloy to 0.0002% to 0.0015%, and thereby maintain a N content in the molten alloy of 0.003% to 0.018%.

8. The method of manufacturing an Fe—Ni—Cr alloy according to claim 6, wherein
the Fe—Ni—Cr alloy is subjected to hot rolling and cold rolling prior to the blackening treatment.

9. A method of manufacturing a sheath heater comprising producing a sheath of a sheath heater using an Fe—Ni—Cr alloy obtained by the method of manufacturing an Fe—Ni—Cr alloy according to claim 6.

10. The Fe—Ni—Cr alloy strip according to claim 4, wherein the Fe—Ni—Cr alloy has a blackened coating at a surface thereof,
the blackened coating contains Fe, Cr, Ni, Si, Mn, Al, Ti, and O, and, by mass %, has a Ti content of 1.9% to 4.5% and an Al content of 0.3% to 3.8%, and
the blackened coating has a thickness of 0.5 μm to 10 μm.

11. The Fe—Ni—Cr alloy strip according to claim 10, wherein
the blackened coating has an emissivity of 0.3 or more.

12. The sheath heater according to claim 5, wherein
the Fe—Ni—Cr alloy has a blackened coating at a surface thereof,
the blackened coating contains Fe, Cr, Ni, Si, Mn, Al, Ti, and O, and, by mass %, has a Ti content of 1.9% to 4.5% and an Al content of 0.3% to 3.8%, and
the blackened coating has a thickness of 0.5 μm to 10 μm.

13. The sheath heater according to claim 12, wherein
the blackened coating has an emissivity of 0.3 or more.

14. The method of manufacturing an Fe—Ni—Cr alloy according to claim 7, wherein
the Fe—Ni—Cr alloy is subjected to hot rolling and cold rolling prior to the blackening treatment.

15. The method of manufacturing a sheath heater according to claim 9, wherein,
the chemical composition of the Fe—Ni—Cr alloy is adjusted through refining performed after melting of alloy raw material, and
in the refining, a mixed gas of oxygen and argon is blown into molten alloy resulting from melting of the alloy raw material to perform decarburization, chromium reduction is subsequently performed, and then aluminum, limestone, and fluorite are added to the molten alloy so as to adjust oxygen concentration in the molten alloy to 0.0002% to 0.007% and sulfur concentration in the molten alloy to 0.0002% to 0.0015%, and thereby maintain a N content in the molten alloy of 0.003% to 0.018%.

16. The method of manufacturing a sheath heater according to claim 9, wherein,
   the Fe—Ni—Cr alloy is subjected to hot rolling and cold rolling prior to the blackening treatment.

17. The method of manufacturing a sheath heater according to claim 15, wherein,
   the Fe—Ni—Cr alloy is subjected to hot rolling and cold rolling prior to the blackening treatment.

\* \* \* \* \*